United States Patent
Yokomakura et al.

(10) Patent No.: US 8,917,788 B2
(45) Date of Patent: *Dec. 23, 2014

(54) WIRELESS COMMUNICATION SYSTEM, BASE STATION APPARATUS, AND MOBILE STATION APPARATUS

(75) Inventors: Kazunari Yokomakura, Osaka (JP); Yasuhiro Hamaguchi, Osaka (JP); Osamu Nakamura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 146 days.

This patent is subject to a terminal disclaimer.

(21) Appl. No.: 13/386,040

(22) PCT Filed: Jul. 16, 2010

(86) PCT No.: PCT/JP2010/062105
§ 371 (c)(1),
(2), (4) Date: Feb. 16, 2012

(87) PCT Pub. No.: WO2011/010618
PCT Pub. Date: Jan. 27, 2011

(65) Prior Publication Data
US 2012/0134441 A1 May 31, 2012

(30) Foreign Application Priority Data
Jul. 22, 2009 (JP) .................... 2009-170789

(51) Int. Cl.
*H04B 7/02* (2006.01)
*H04B 7/06* (2006.01)
*H04W 52/36* (2009.01)
*H04W 52/02* (2009.01)

(52) U.S. Cl.
CPC .............. *H04B 7/0665* (2013.01); *H04B 7/063* (2013.01); *Y02B 60/50* (2013.01); *H04B 7/0691* (2013.01); *H04W 52/365* (2013.01); *H04W 52/0229* (2013.01)
USPC ........................... 375/267; 375/299; 455/522

(58) Field of Classification Search
CPC .... H04B 7/063; H04B 7/0665; H04B 7/0691; H04W 52/0229; H04W 52/08; H04W 52/146; H04W 52/18; H04W 52/365; H04W 52/42; Y02B 60/50
USPC .................. 375/260, 267, 299, 347; 370/252; 455/69, 522
See application file for complete search history.

(56) References Cited

U.S. PATENT DOCUMENTS

2010/0091725 A1 4/2010 Ishii
2010/0091726 A1 4/2010 Ishii et al.
(Continued)

FOREIGN PATENT DOCUMENTS

JP 2005-244854 A 9/2005
WO WO 2008/108222 A1 9/2008

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010).

*Primary Examiner* — David B. Lugo
(74) *Attorney, Agent, or Firm* — Birch, Stewart, Kolasch & Birch, LLP

(57) ABSTRACT

By taking into account the power consumption and PH of a mobile station apparatus on an uplink, while communication quality is maintained, the efficiency of power consumption is improved. There are provided a PUSCH reception section 14 for receiving a PUSCH (Physical Uplink Shared CHannel) signal from the mobile station apparatus; a PH detection section 15 for detecting the PH (Power Headroom) from the received PUSCH signal; a transmission antenna number determination section 16 for determining, from the detected PH, the number of transmission antennas that the mobile station apparatus uses; a DCI generation section 10 for generating DCI (Downlink Control Information) based on frequency assignment information of the mobile station apparatus on the uplink; and a PDCCH transmission section 11 for converting the generated DCI and the determined transmission antenna number information into a PDCCH (Physical Downlink Control CHannel) signal to transmit the PDCCH signal to the mobile station apparatus.

6 Claims, 6 Drawing Sheets

(56) References Cited

U.S. PATENT DOCUMENTS

| | | |
|---|---|---|
| 2010/0091727 A1 | 4/2010 | Ishii |
| 2010/0098008 A1 | 4/2010 | Ishii et al. |
| 2010/0099429 A1 | 4/2010 | Ishii et al. |
| 2010/0111008 A1 | 5/2010 | Ishii |
| 2010/0150085 A1 | 6/2010 | Ishii et al. |
| 2010/0311437 A1* | 12/2010 | Palanki et al. ............ 455/456.1 |
| 2011/0105059 A1* | 5/2011 | Gaal et al. ................. 455/127.1 |
| 2012/0224535 A1* | 9/2012 | Kim et al. ..................... 370/328 |
| 2013/0028231 A1* | 1/2013 | Zhang et al. ................. 370/329 |
| 2013/0100833 A1* | 4/2013 | Xu et al. ....................... 370/252 |

* cited by examiner

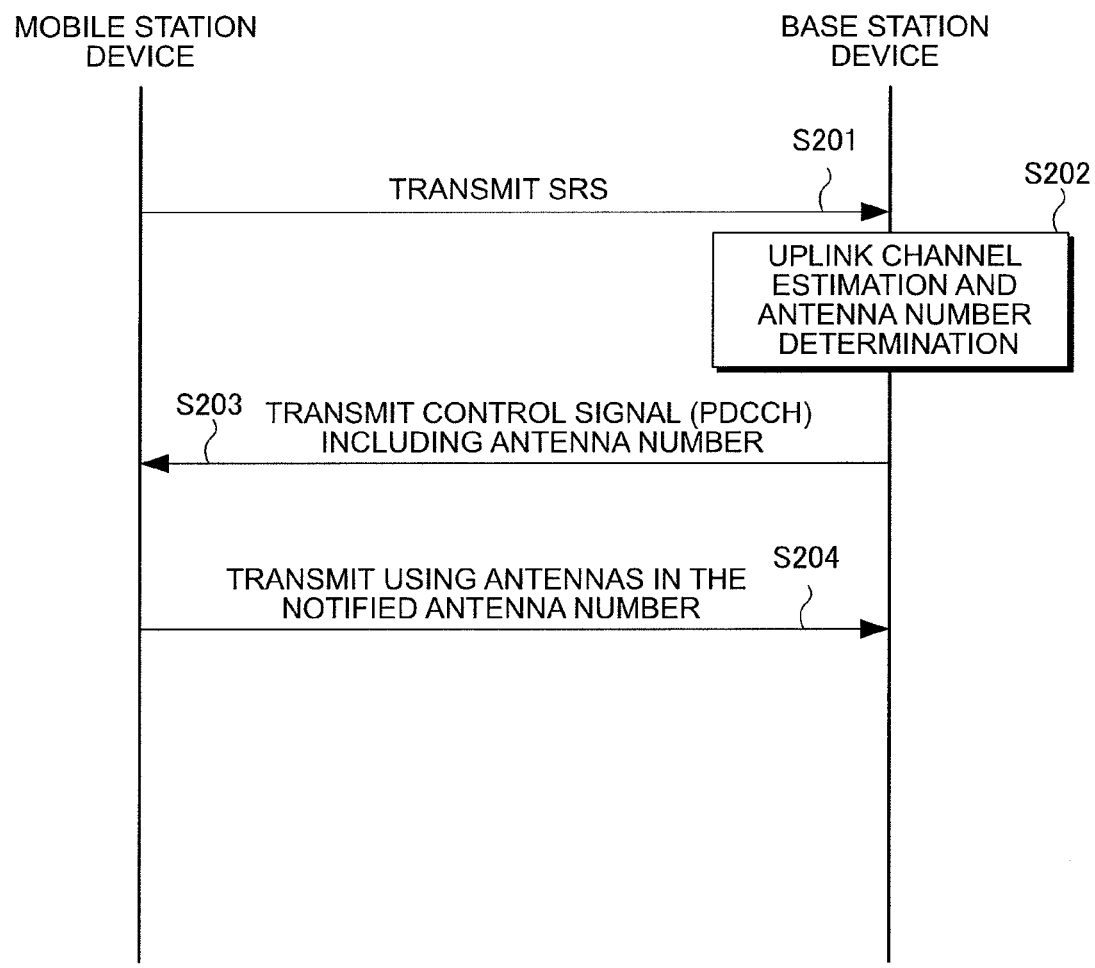

WIRELESS COMMUNICATION SYSTEM, BASE STATION APPARATUS, AND MOBILE STATION APPARATUS

TECHNICAL FIELD

The present invention relates to a wireless communication system, base station apparatus, and mobile station apparatus of which power consumption is taken into account, in the case where transmission is performed by using a plurality of transmission antennas.

BACKGROUND ART

The standardization of the LTE (Long Term Evolution) system that is the 3.9 generation mobile-phone wireless communication system has almost been completed, and recently, the standardization of LTE-A (referred to as LTE-Advanced, IMT-A, or the like) that is the 4th generation wireless communication system in which the LTE system is further evolved has been started.

A single carrier frequency division multiple access (SC-FDMA) is adopted in view of power consumption on an uplink in LTE system.

Further, in LTE-A system, in order to realize high capacity on the uplink in a large scale terminal such as a notebook computer, it is determined to introduce a MIMO (Multiple-Input Multiple-Output) technique by which the different data is multiplexed at the same time/frequency by using a plurality of transmission/reception antennas, or a transmission diversity technique by which the same data is transmitted by using a plurality of transmission antennas (for example, Non-patent document 1).

RELATED ART DOCUMENTS

Non-Patent Documents

Non-patent document 1: 3GPP TR 36.814

SUMMARY OF THE INVENTION

Problems to be Solved by the Invention

However, there has been a problem in that the transmission using the plurality of transmission antennas requires amplifiers, D/A (Digital to Analogue) converters, and the like in the number of transmission antennas, and if communication is performed by simply increasing the number of antennas, the power consumption of the mobile station apparatus is significantly increased.

The present invention has been made in view of such circumstances, and it is an objective to provide a wireless communication system, base station apparatus, and mobile station apparatus by which by taking into account the power consumption and a PH of the mobile station apparatus on the uplink, while communication quality can be maintained, the efficiency of power consumption can be improved.

Means of Solving the Problems (1) In order to achieve the above-described objective, the present invention takes the measure as described below. That is, according to the present invention, there is provided a wireless communication system in which a first communication device having a plurality of transmission antennas and a second communication device perform wireless communication, wherein a number of transmission antennas used when the first communication device transmits a signal is determined based on a transmit power value in the first communication device.

In this manner, in the present invention, since the number of transmission antennas used when the first communication device transmits the signal is determined based on the transmit power value in the first communication device, it becomes possible to perform suitable transmission with a plurality of antennas of which power consumption is taken into account.

(2) Further, in the wireless communication system of the present invention, the transmit power value is a PH (Power Headroom).

In this manner, since the number of transmission antennas used when the first communication device transmits the signal is determined based on the PH (Power Headroom), it becomes possible to perform the suitable transmission with the plurality of transmission antennas in which not only maximum transmit power of the mobile station apparatus, but also a passloss, shadowing, and an assigned transmission bandwidth are taken into account.

(3) Further, in the wireless communication system of the present invention, when the number of transmission antennas determined at an immediately preceding communication opportunity is two or more, the PH is calculated by defining a maximum transmit power value in the first communication device as a maximum transmit power value when transmission is performed by using one transmission antenna, and the number of transmission antennas used at a next communication opportunity is determined by using the calculated PH.

In this manner, since the PH is calculated by defining the maximum transmit power value in the first communication device as the maximum transmit power value when the transmission is performed by using the one transmission antenna, it is possible to appropriately stably determine the number of transmission antennas.

(4) Further, in the wireless communication system of the present invention, when the number of transmission antennas determined at an immediately preceding communication opportunity is two or more, the number of transmission antennas used at a next communication opportunity is determined by using a value obtained by multiplying the PH calculated based on each maximum transmit power at each transmission antenna by the number of transmission antennas.

In this manner, since the number of transmission antennas used at the next communication opportunity is determined by using the value obtained by multiplying the PH determined based on each of the maximum transmit powers at each of the transmission antennas by the number of transmission antennas, it is possible to appropriately stably determine the number of transmission antennas.

(5) Further, according to the present invention, there is provided a wireless communication system in which a first communication device having a plurality of transmission antennas and a second communication device perform wireless communication, wherein a combination by which a number of transmission antennas used when the first communication device transmits a signal is smallest, of combinations of a modulation scheme, a coding rate and a rank that satisfy a desired reception quality and that achieve a maximum bit rate, in the second communication device is selected.

In this manner, by selecting the combination by which the number of transmission antennas used when the first communication device transmits the signal is smallest, of the combinations of the modulation scheme, the coding rate and the rank that satisfy the desired reception quality and that achieve the maximum bit rate, it is possible to select the combination which achieves a maximum throughput characteristic and in addition, causes the number of transmission antennas to be smallest, and it is possible to suppress power consumption in the mobile station apparatus.

(6) Further, a base station apparatus of the present invention performs wireless communication with a mobile station apparatus having a plurality of transmission antennas, and includes: a PUSCH reception section for receiving a PUSCH (Physical Uplink Shared CHannel) signal from the mobile station apparatus; a PH detection section for detecting a PH (Power Headroom) from the received PUSCH signal; a transmission antenna number determination section for determining, from the detected PH, the number of transmission antennas that the mobile station apparatus uses; a DCI generation section for generating DCI (Downlink Control Information) based on frequency assignment information of the mobile station apparatus on an uplink; and a PDCCH transmission section for converting the generated DCI and the determined transmission antenna number information into a PDCCH (Physical Downlink Control CHannel) signal to transmit the PDCCH signal to the mobile station apparatus.

In this manner, since the base station apparatus determines, from the detected PH, the number of transmission antennas that the mobile station apparatus uses, the mobile station apparatus can perform the suitable transmission with the plurality of antennas of which power consumption is taken into account.

(7) Further, a mobile station apparatus of the present invention has a plurality of transmission antennas, performs wireless communication with the base station apparatus according to the above-described (6), and includes: a PDCCH reception section for receiving a PDCCH from the base station apparatus; a DCI detection section for detecting DCI from the received PDCCH; a PH calculation section for calculating a PH based on the detected DCI; a transmission antenna number detection section that detects information indicating the transmission antenna number from the received PDCCH; and a PUSCH transmission section for converting the calculated PH into a PUSCH signal to transmit the PUSCH signal to the base station apparatus by using transmission antennas in the detected number.

In this manner, since the mobile station apparatus calculates the PH based on the detected DCI to transmit the PUSCH signal to the base station apparatus by using transmission antennas in the detected number, the mobile station apparatus can perform the suitable transmission with the plurality of antennas of which power consumption is taken into account.

(8) Further, a base station apparatus of the present invention performs wireless communication with a mobile station apparatus having a plurality of transmission antennas, and includes: a radio reception section for receiving a PUSCH (Physical Uplink Shared CHannel) from the mobile station apparatus; an SRS detection section for detecting an SRS (Sounding Reference Signal) from the received PUSCH signal; a channel state estimation section for estimating a channel state based on the detected SRS; a scheduling section for performing assignment of frequencies for the mobile station apparatus, based on information indicating the estimated channel state, to output frequency assignment information; a link/rank/layer number selection section for selecting a modulation scheme, a coding rate and a rank that satisfy a desired reception quality and that achieve a maximum bit rate, based on the frequency assignment information and the information indicating the estimated channel state; a link/rank/layer number determination section for selecting a combination by which a number of transmission antennas used when the mobile station apparatus transmits a signal is smallest, of combinations of the selected modulation scheme, coding rate and rank; a PDCCH signal generation section for converting information indicating the combination of the selected modulation scheme, coding rate and rank, and information indicating the number of transmission antennas corresponding to the combination, into a PDCCH (Physical Downlink Control CHannel) signal; and a radio transmission section for radio-transmitting the PDCCH signal to the mobile station apparatus.

In this manner, since the base station apparatus selects the combination by which the number of transmission antennas used when the mobile station apparatus transmits the signal is smallest, of the combinations of the selected modulation scheme, coding rate and rank, the mobile station apparatus can perform the suitable transmission with the plurality of transmission antennas in which not only maximum transmit power, but also a passloss, shadowing, and an assigned transmission bandwidth are taken into account.

(9) Further, a mobile station apparatus of the present invention has a plurality of transmission antennas, performs wireless communication with the base station apparatus according to the above-described (8), and includes: a radio reception section for receiving a PDCCH from the base station apparatus; a modulation scheme/coding rate/rank detection section for detecting information indicating a combination of a modulation scheme, coding rate and rank, from the received PDCCH; an antenna number detection section for detecting a number of transmission antennas for detecting the number of transmission antennas from the received PDCCH; and a radio transmission section for converting transmission data into a PUSCH signal, based on the detected modulation scheme, coding rate and rank to transmit the PUSCH signal to the base station apparatus by using transmission antennas in the detected number.

In this manner, since the mobile station apparatus converts the transmission data into the PUSCH signal, based on the detected modulation scheme, coding rate and rank to transmit the PUSCH signal to the base station apparatus by using the transmission antennas in the detected number, the mobile station apparatus can perform the suitable transmission with the plurality of transmission antennas in which not only maximum transmit power, but also a passloss, shadowing, and an assigned transmission bandwidth are taken into account.

Effects of the Invention

According to the present invention, when transmission is performed by using a plurality of transmission antennas, the number of transmission antennas to be used is determined in accordance with combinations of transmission methods that satisfy transmit power and reception quality, and thereby it is possible to provide an efficient system in which power consumption is taken into account.

BRIEF DESCRIPTION OF THE DRAWINGS

FIG. 6 is a view showing one example of a sequence chart showing the operation of the mobile station apparatus and the base station apparatus according to the second embodiment of the present invention.

BEST MODES FOR CARRYING OUT THE INVENTION

Embodiments of the invention will now be described with reference to drawings. Also, in the following embodiments, although an uplink in which power consumption is a problem is an object, but is not limited to this. Furthermore, although the following embodiments are described by an SC-FDMA system by assuming an LTE-A system, the case where the number of transmission antennas is controlled by Clustered DFT-S-OFDM, OFDM or the like also is essentially the same as it.

First Embodiment

As a first embodiment, a method for controlling the number of transmission antennas in accordance with transmit power will be described. Since the magnitude of transmit power exerts a great effect on the power consumption of a mobile station apparatus, a power headroom (PH) indicating how much an allowance exists in the transmit power of the mobile station apparatus is transmitted as a part of data, in an LTE uplink. In the embodiment, this PH is defined as a reference of power consumption.

To begin with, the mobile station apparatus detects uplink frequency assignment information (that is information related to what frequency within a system band is used, and the notification of the uplink information is performed by DCI named format 0 in LTE) from a DCI (Downlink Control Information) included in a downlink PDCCH (Physical Downlink Control CHannel). Data communication is performed by using a channel referred to as an uplink PUSCH (Physical Uplink Shared CHannel) by using the obtained frequency assignment. At this time, a PH is included within transmitted data, the allowance of transmit power necessary in the communication of the PUSCH is indicated in steps of 1 dB from 40 dB to –23 dB relative to the transmit power of the mobile station apparatus. The number of transmission antennas is determined from the value of this PH. For example, if the value of the PH is not less than 10 dB, the number of transmission antennas can be set to four; if the value of the PH is 7 to 10 dB, the number of transmission antennas can be set to three; if the value of the PH is 4 to 7 dB, the number of transmission antennas can be set to two; if the value of the PH is not more than 4 dB, and the number of transmission antennas can be set to one. Although this is only one example, for example, these values may be set in view of the power consumption of an amplifier used in the mobile station apparatus, and the like.

Figure 1:
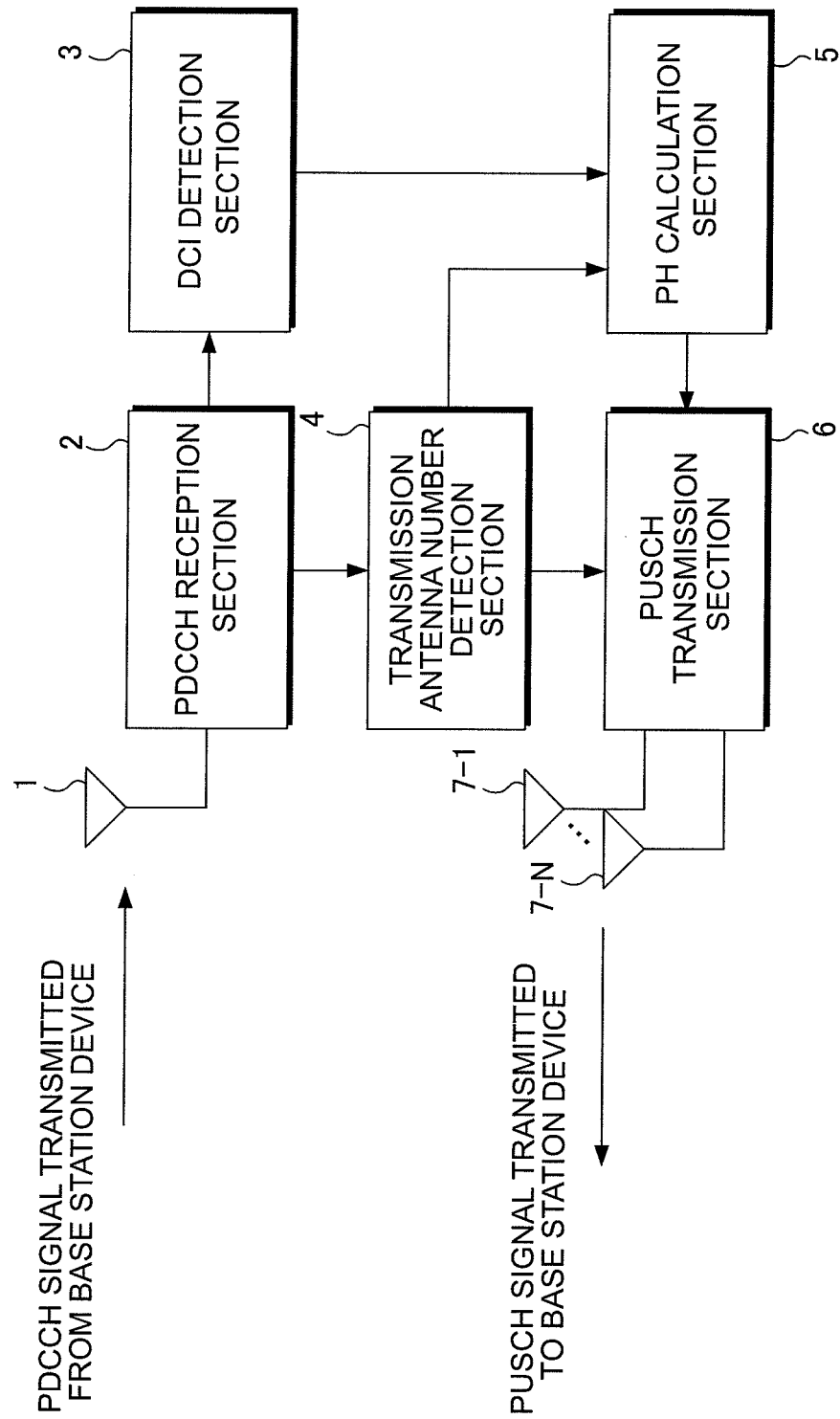
FIG. 1 is a block diagram showing a schematic configuration of a mobile station apparatus according to a first embodiment of the present invention.

FIG. 1 is a block diagram showing a schematic configuration of the mobile station apparatus according to the first embodiment of the present invention. The mobile station apparatus includes a reception antenna 1, a PDCCH reception section 2, a DCI detection section 3, a transmission antenna number detection section 4, a PH calculation section 5, a PUSCH transmission section 6, and a transmission antenna 7.

By using a PDCCH signal received at the reception antenna 1, the bit related to control information included within the PDCCH signal is detected by the PDCCH reception section 2, and the position of the frequency and the transmission bandwidth assigned on the uplink is detected by the DCI detection section 3. At the same time, the transmission antenna number multiplexed into the PDCCH is detected in the transmission antenna number detection section 4, and it is input to the PUSCH transmission section 6. The PH is calculated by the PH calculation section 5 based on the detected DCI.

The PH is expressed as $P_{max}$-$P_{tx}$. $P_{max}$ is the maximum transmit power of the mobile station apparatus, and is, for example 23 dBm or the like; and $P_{tx}$ is the transmit power necessary for achieving desired reception power in a base station apparatus, and is determined in view of a passloss, shadowing, and the assigned transmission bandwidth. It is indicated that the larger the value of the PH is, the larger the allowance in the power is, and if the value is small, there is no allowance. Furthermore, when the value becomes a negative number, it means that it is impossible to achieve the desired reception power. Also, since the PH is indicated in steps of 1 dB from 40 dB to –23 dB, if the PH is not less than 40 dB, the PH is 40 dB, and if the PH is not more than –23 dB, the PH is –23 dB.

The value of the PH thus calculated and the transmission antenna number are simultaneously input to the PUSCH transmission section 6, a transmission signal is generated in accordance with a PUSCH transmission scheme (SC-FDMA) together with the other data to be transmitted, and the transmission signals are simultaneously transmitted from antennas in the determined number, of transmission antennas 7-1 to 7-N. Also, since the transmission antenna 7 is variable, the data and signal are actually transmitted by using antennas in the number detected in the transmission antenna number detection section 4. Also, about the transmission antenna that is not used, power consumption is decreased by turning off the power source of the amplifier.

Figure 2:
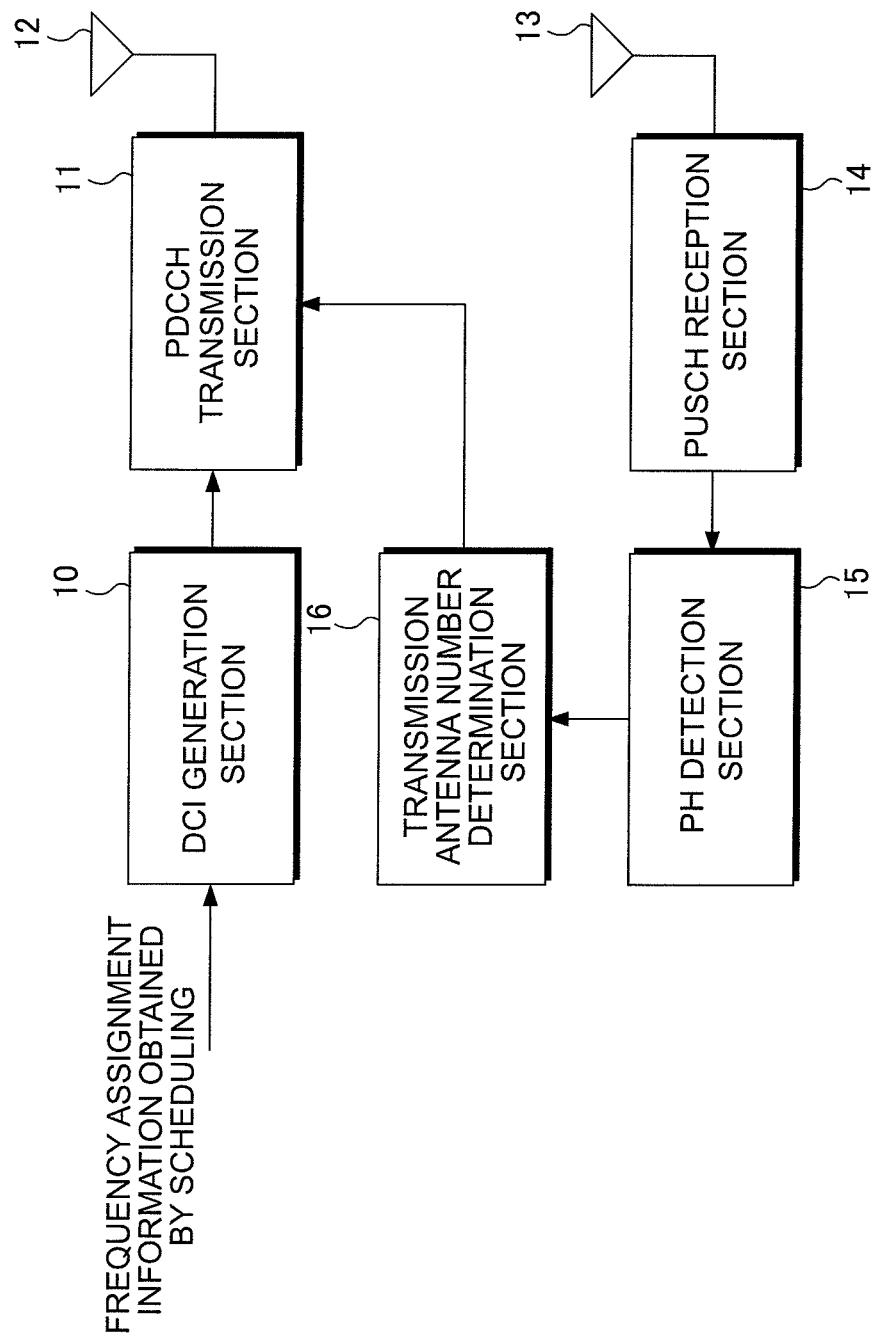
FIG. 2 is a block diagram showing a schematic configuration of a base station apparatus according to the first embodiment of the present invention.

FIG. 2 is a block diagram showing a schematic configuration of the base station apparatus according to the first embodiment of the present invention. The base station apparatus includes a DCI generation section 10, a PDCCH transmission section 11, a transmission antenna 12, a reception antenna 13, a PUSCH reception section 14, a PH detection section 15, and a transmission antenna number determination section 16.

In the base station apparatus, by using frequency assignment information obtained by the scheduling by which each assignment frequency of each mobile station apparatus, on the uplink is determined, the DCI generation section 10 generates DCI of which the mobile station apparatus is notified. The generated DCI, together with information related to the transmission antenna number obtained from the transmission antenna number determination section 16 is multiplexed, as a PDCCH signal, by the PDCCH transmission section 11, and is converted into a transmission signal to be transmitted by the transmission antenna 12. In contrast, a PUSCH signal transmitted from the mobile station apparatus is received by the reception antenna 13, and a transmitted bit sequence is detected by the PUSCH reception section 14. The PH is detected from the obtained bit sequence by the PH detection section 15, the value is input to the transmission antenna number determination section 16, which determines the transmission antenna number, and the transmission antenna number is input to the PDCCH transmission section 11.

In this manner, by determining the number of transmission antennas to be used in accordance with PH, it becomes possible to perform the suitable transmission with a plurality of antennas of which power consumption is taken into account. Also, in the present invention, although the PH representing transmit power is used, the control using a radio and circuit parameter by which the other transmit power or power consumption can be grasped also are included in the present invention. Further, although the transmission antenna number is switched, the number of amplifiers, D/A converters, and the like connected to each transmission antenna also is controlled.

Further, as transmission schemes using a plurality of transmission antennas, there are not only a transmission antenna diversity technique such as a STBC (Space Time Block Code), SFBC (Space Frequency Block Code), or FSTD (Frequency Switching Transmit Diversity), or a MIMO technique, but also space division multiplexing technique of closed loop control using precoding, and even if these are applied, these application are included in the present invention.

Figure 3:
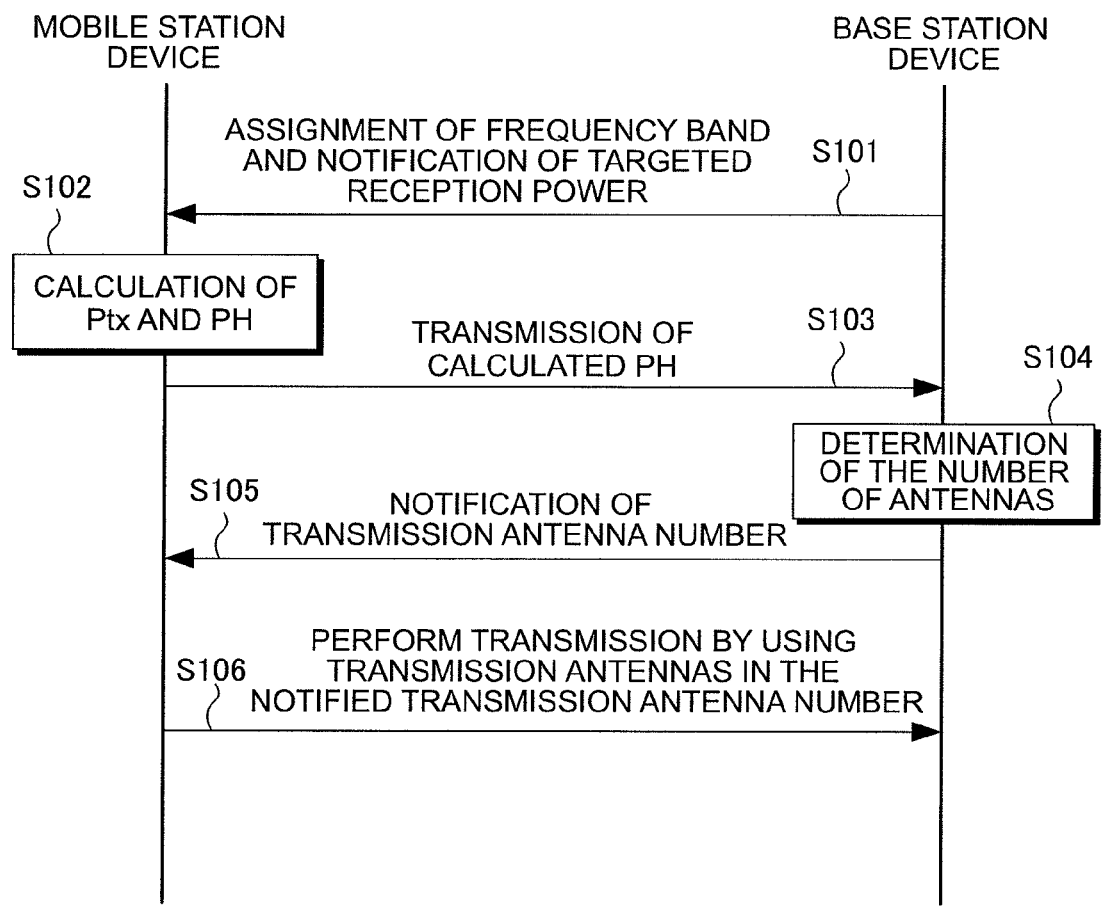
FIG. 3 is a view showing one example of a sequence chart showing the operation of the mobile station apparatus and the base station apparatus according to the first embodiment of the present invention.

FIG. 3 is a sequence chart showing one example of the operation of the mobile station apparatus and the base station apparatus according to the first embodiment of the present invention. The base station apparatus performs, for the mobile station apparatus, the assignment of a frequency bandwidth and the notification of targeted reception power (step S101). The mobile station apparatus calculates the $P_{tx}$ and PH, based on broadcast information transmitted from the base station apparatus (step S102). Next, the mobile station apparatus transmits the calculated PH to the base station apparatus (step S103). The base station apparatus determines the transmission antenna number from the received PH (step S104). The mobile station apparatus is notified of the determined transmission antenna number (step S105). The base station apparatus performs transmission by using the transmission antennas in the notified transmission antenna number (step S106).

A method for setting the PH will now be described. When the transmission antenna number is determined, since the maximum transmit power is defined as the sum of all transmission antennas, if the plurality of transmission antennas are used, since the maximum transmit power of each transmission antenna becomes the maximum transmit power of the mobile station apparatus divided by the transmission antenna number, the value of the PH becomes lower than the actual value. For example, when the maximum transmit power of the mobile station apparatus is 23 dBm and the transmission antenna number is four at the previous transmission opportunity, the maximum transmit power of each transmission antenna is 17 dBm of one-fourth. Therefore, the PH calculated in each transmission antenna is 17 dBm in the maximum transmit power. If the base station apparatus is notified of this, even though transmission can actually be performed with transmission antennas in the transmission antenna number of four kept, if the reference of the PH used to determine the antenna number is the same as that in the case of one antenna, a phenomenon in which the transmission antenna number decreases occurs, and it becomes unstable.

Therefore, the PH transmitted to the base station apparatus is adjusted to add an allowance for transmit power, relative to the maximum transmit power in the case of being transmitted by one transmission antenna, and is transmitted. For example, in the above-described example, when four transmission antennas are used, although the PH transmitted from each transmission antenna is calculated by subtracting the transmit power actually transmitted from each transmission antenna, from 17 dB, the PH obtained by multiplying the value by the transmission antenna number is transmitted. For example, it is set as shown in the following table.

TABLE 1

| Previously determined transmission antenna number | PH |
|---|---|
| 2 | +3 dB |
| 3 | +5 dB |
| 4 | +6 dB |

Thereby, it is possible to appropriately stably determine the transmission antenna number. Also, in the present invention, although the transmission antenna number is determined for each transmission opportunity, when low-speed transmit power control (transmit power control to compensate for distance attenuation and shadowing) is utilized, the transmission antenna number may be semi-statically determined. Of course, although the setting of the transmission antenna number according to the present invention is performed by the base station apparatus, the setting may be performed in the mobile station apparatus and the base station apparatus may be notified. Further, although the setting of the PH is performed in the mobile station apparatus, since the transmission antenna number can be grasped also in the base station apparatus, the setting may be performed in the base station apparatus.

Second Embodiment

In the present embodiment; given that by performing link adaptation and rank adaptation that provide the optimization of a communication method by a radio link (link), while a desired radio quality (reception quality) is satisfied, the maximum bit rate (throughput) is achieved; when a plurality of combinations of transmission methods that satisfy the reception quality exists; by selecting the combination in which the reception antenna number becomes smallest; there is provided a technique for controlling the power consumption of the mobile station apparatus to be minimized. Here, the link adaptation, in which an adaptive modulation and coding schemes (AMC) and the like are used, is to adaptively control a modulation scheme and a coding rate in accordance with radio quality, and the rank adaptation is a technique by which the number of streams (rank) that can be multiplexed on a radio channel is estimated and by which the rank is adaptively changed, when MIMO multiplexing is performed. Here, to begin with, to simplify the explanation, the case of a full rank in which the transmission antenna number accords with the rank will be described.

For example, when QPSK at a coding rate ⅓ of rank 3, QPSK at a coding rate ½ of rank 2, or 16QAM at a coding rate ½ of rank 1 can be selected, as the combination in which throughput becomes highest, in a certain reception quality, although these can all be transmitted at the same bit rate, one that causes the transmission antenna number to be smallest is desirable, in view of the power consumption of the mobile station apparatus. Therefore, in this case, the 16QAM at the coding rate ½ of rank 1 is selected, and transmission is performed from one transmission antenna.

In this manner, in the present invention, when there are a plurality of transmission methods that achieve the same throughput, by performing control so that the transmission antenna number becomes smallest, the power consumption in the mobile station apparatus can be suppressed to be low.

Further, since the transmission antenna number does not generally agree with the rank, three or more transmission antennas may be used, also in rank 2. In this case, the transmission antenna number by which power consumption can suppressed to be as small as possible, in addition to a modulation scheme, and a coding rate/rank is determined. For example, if the number of available transmission antennas of a terminal is four, the three cases where the transmission antenna number that can realize rank 2 is from two to four are supposed. About these three cases, as a result of the calculation of the modulation scheme and coding rate that can satisfy a desired communication quality, by selecting the transmission antenna number that is smallest, of the transmission antenna numbers that can realize the maximum bit rate, while the desired communication quality and the maximum transmission bit rate can be maintained, the power consumption of the terminal can be suppressed. Also, depending on standards, the transmission antenna number may be referred to as the number of layers.

To show it with a specific case, in the following table, an example of the modulation schemes and coding rates that can realize the maximum bit rate in the case where the transmission antenna number and the rank are determined in a certain condition is shown. However, the maximum transmission antenna number of the terminal is four.

TABLE 2

|  | One | Two | Three | Four |
| --- | --- | --- | --- | --- |
| Rank 1 | QPSK R = ¾ (1.5) | 16QAM R = ½ (2.0) | 16QAM R = ¾ (3.0) | 64QAM R = ⅔ (4.0) |
| Rank 2 | — | QPSK R = ½ (2.0) | 16QAM R = ½ (4.0) | 16QAM R = ½ (4.0) |
| Rank 3 | — | — | BPSK R = ¾ (2.25) | QPSK R = ½ (3.05) |
| Rank 4 | — | — | — | BPSK R = ½ (2.0) |

" . . . " of the above table means the combinations that can not realize communication. Further, R means a coding rate. Further, a value denoted by (x) is a value that represents a bit rate, and is calculated by a rank x (the number of bits capable of transmitting by the modulation scheme) x R. The number of bits capable of transmitting by each modulation scheme is 1 in BPSK, 2 in QPSK, and 4 in 16QAM. In the condition as shown in this table, the maximum bit rate is achieved by the cases where the rank is rank 2 and the antenna number is three or four, or the rank is rank 1 and the antenna number is four. In view of reducing power consumption of the terminal, since it is preferred that the number of used antennas is reduced, the selected antenna number, rank and modulation scheme are three in the antenna number, rank 2, 16QAM in modulation scheme, and ½ in coding rate, respectively.

Figure 4:
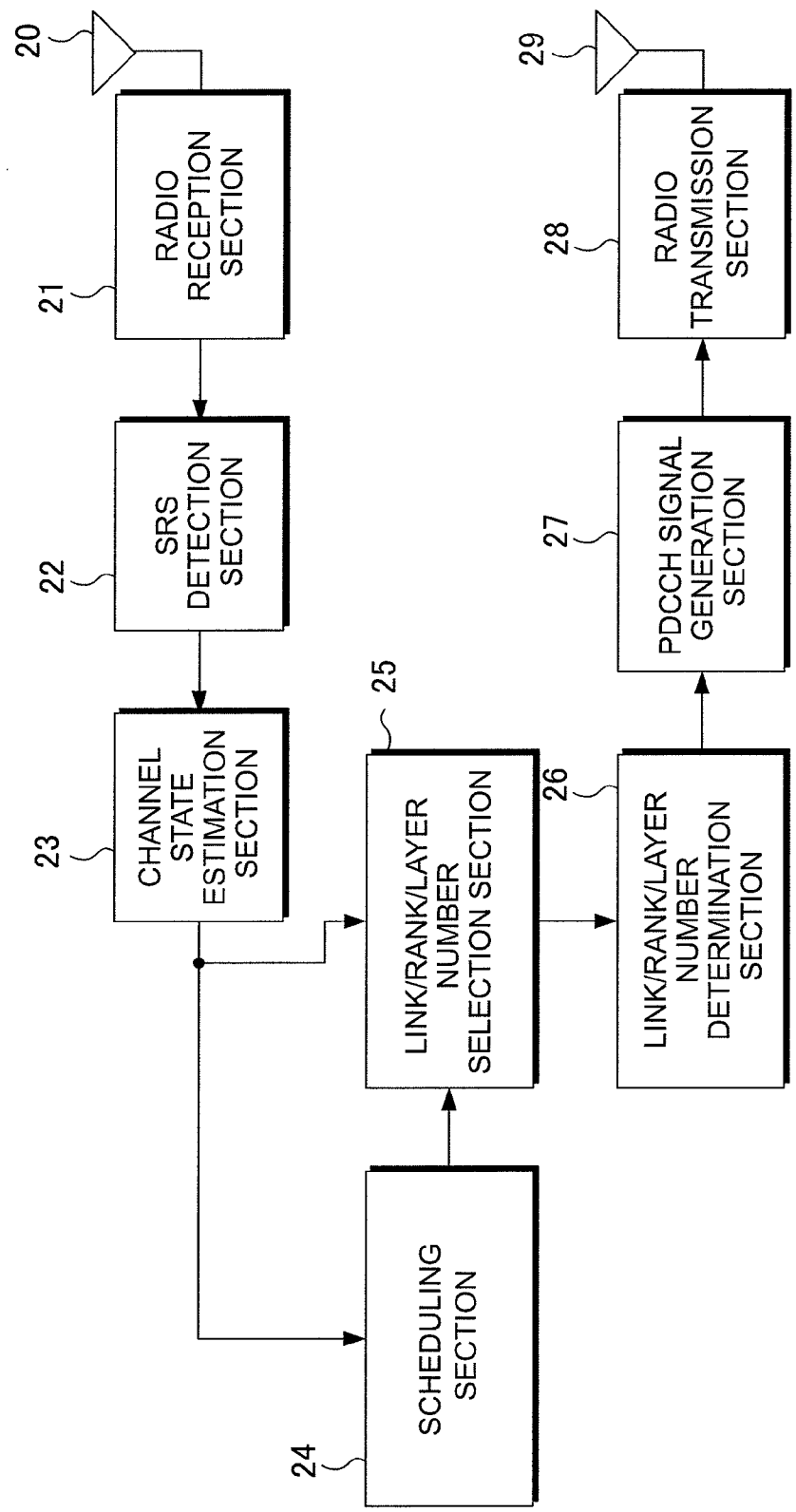
FIG. 4 is a block diagram showing a schematic configuration of a base station apparatus according to a second embodiment of the present invention.

FIG. 4 is a block diagram showing a schematic configuration of a base station apparatus according to the second embodiment of the present invention. The base station apparatus includes a reception antenna 20, a radio reception section 21, an SRS detection section 22, a channel state estimation section 23, a scheduling section 24, a link/rank/layer number selection section 25, a link/rank/layer number determination section 26, a PDCCH signal generation section 27, a radio transmission section 28, and a transmission antenna 29.

To begin with, at the reception antenna 20, a signal transmitted by the mobile station apparatus is received, and the signal is down-converted into a baseband signal in the radio reception section 21. In the SRS detection section 22, a well-known signal for measuring frequency response in a system band that is referred to as SRS (Sounding Reference Signal) from the signal of the mobile station apparatus is detected, and in the channel state estimation section 23, the state of a channel (frequency gain) is estimated. In the scheduling section 24, a frequency to be assigned is selected by taking into account whether reception status is favorable from the estimated frequency gain and even the use status of the other users, and the resultant is input to the link/rank/layer number selection section 25.

In the link/rank/layer number selection section 25, a modulation scheme, a coding rate and a rank which satisfy a required quality and by which the transmission bit rate becomes highest are selected from the frequency assignment information set by the scheduling section 24 and the reception status estimated by the channel state estimation section 23. At this time, when there is a plurality of candidates about the same transmission bit rate, they all are input to the link/rank/layer number determination section 26 as candidate. In the link/rank/layer number determination section 26, the combination by which the transmission antenna number becomes smallest is generated and the resultant is input to the PDCCH signal generation section 27.

In the PDCCH signal generation section 27, a PDCCH signal is generated into which this information is multiplexed and which is control information to the mobile station apparatus; in the radio transmission section 28, the signal is up-converted into a radio frequency signal; and the resultant is transmitted from the transmission antenna 29.

Also, here, although the information related to the transmission antenna number is multiplexed into the PDCCH, it may be multiplexed into the other signals (a PDSCH (Physical Downlink Shared CHannel) that is a data signal on the downlink), and the other notification may be used. Further, although described later, the base station apparatus may determine only the link/rank, and the layer number representing the transmission antenna number may be determined in the mobile station apparatus. Further, when a link, a lank and a layer number are determined, even if the lowest rank is selected, as a result, since it is equal to controlling the number of physical antennas to be reduced, if a section for eventually controlling the transmission antenna number is included, it is essentially the same as the present invention.

Figure 5:
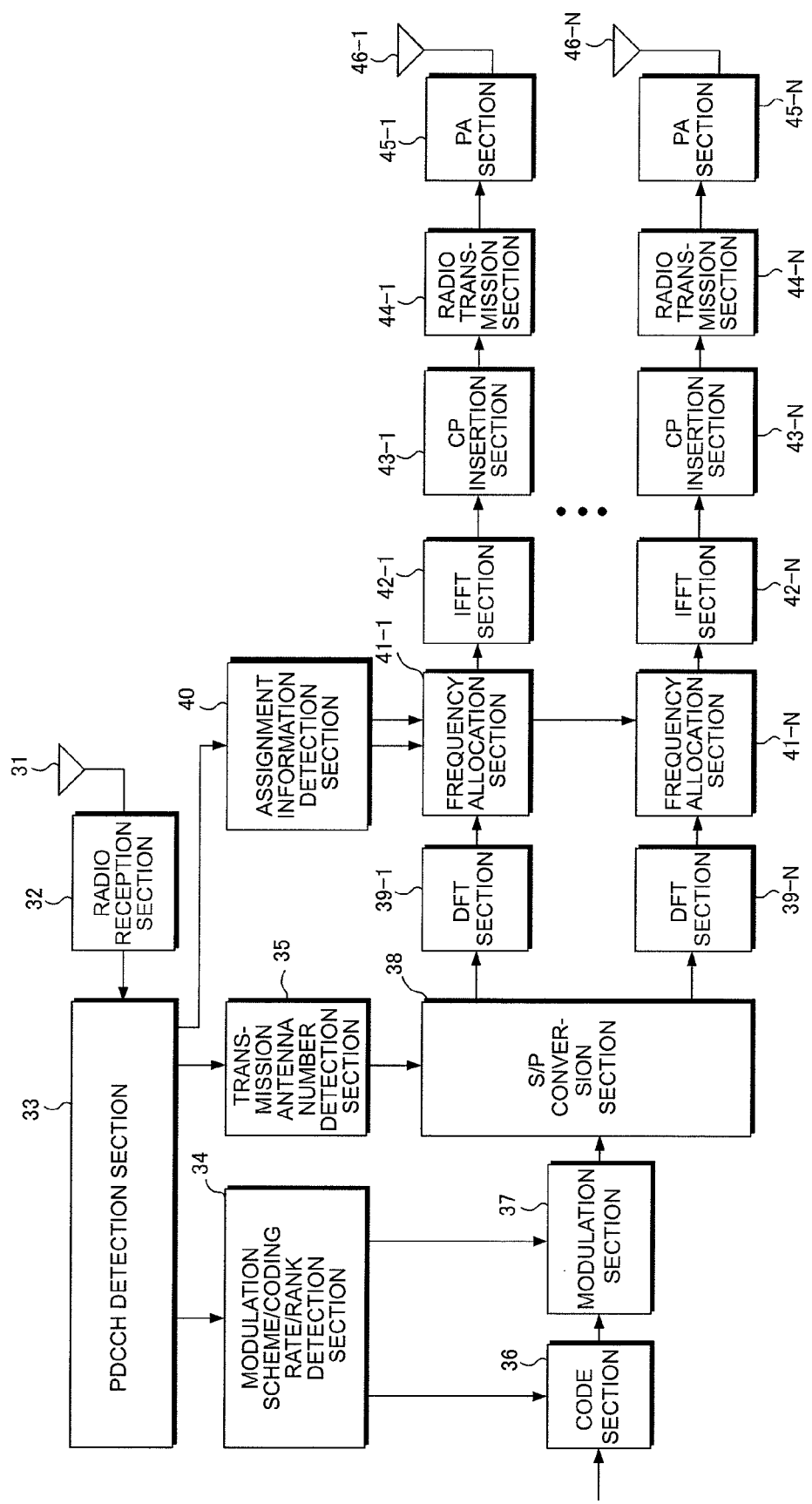
FIG. 5 is a block diagram showing a schematic configuration of a mobile station apparatus according to the second embodiment of the present invention.

FIG. 5 is a block diagram showing a schematic configuration of the mobile station apparatus according to the second embodiment of the present invention. To begin with, at the reception antenna 31, a PDCCH is received, and in a radio reception section 32, it is converted into a baseband signal. Subsequently, in a PDCCH detection section 33, the information into which a modulation scheme, a coding rate, a rank, an antenna number, and the like set in the base station apparatus are multiplexed is detected. Next, in a modulation scheme/coding rate/rank detection section 34, the information related to the modulation scheme and the information related to the coding rate are detected, and the frequency assignment information related to what frequency is used so that transmission is performed is detected in an assignment information detection section 40.

In contrast, transmission data is coded at the input coding rate by a code section 36, and modulation is performed based on the input modulation scheme in a modulation section 37. Subsequently, the resultant is paralleled into the signals of the input rank/transmission antenna number by an S/P (Serial to Parallel) conversion section 38 (The number of paralleled signals is defined as N, and here, the rank and the transmission antenna number accord with each other. When they do not agree with each other, the processing of transmitting the same signals by the plurality of transmission antennas is performed. For example, a transmit diversity scheme such as STBC or SFBC, or the like is applied). Each signal is converted into frequency signals by DFT (Discrete Fourier Transform) sections 39-1 to 39-N, and the signals are allocated to frequencies based on the detected frequency assignment information from the assignment information detection section 40 in frequency allocation sections 41-1 to 41-N.

Subsequently, the resultant is converted into time signals by IFFT sections 42-1 to 42-N, cyclic prefixes are added in CP (Cyclic Prefix) insertion sections 43-1 to 43-N, the resultant is up-converted into radio frequency signals in radio transmission sections 44-1 to 44-N, the resultant is amplified by PA (Power Amplifier) sections 45-1 to 45-N, and the resultant is transmitted from transmission antennas 46-1 to 46-N.

FIG. 6 is one example of a sequence chart showing the operation of the mobile station apparatus and the base station apparatus according to the second embodiment of the present invention. The mobile station apparatus transmits a well-known pilot signal for roughly grasping the state of a channel on the uplink that is referred to as SRS, for example (step S201). The base station apparatus determines the smallest number of antennas on the assumption that by performing uplink channel estimation form the transmitted signal and rank adaptation in data transmission on the uplink, while satisfying a desired radio quality (reception quality), the base station apparatus achieves the maximum bit rate (throughput) (step S202). Subsequently, the base station apparatus transmits a control signal (PDCCH) including the determined number of antennas to the mobile station apparatus (step S203). The mobile station apparatus performs transmission by using the transmission antennas in the notified transmission antenna number (step S204).

In this manner, by selecting the combination by which the transmission antenna number is smallest, of the combinations that can achieve the maximum throughput characteristic, the power consumption in the mobile station apparatus can be suppressed.

The present invention is favorably used in a mobile communication system having a portable phone device as the mobile station apparatus, but is not limited to this.

DESCRIPTION OF THE REFERENCE NUMERALS

- 2 PDCCH reception section
- 3 DCI detection section
- 4, 35 transmission antenna number detection section
- 5 PH calculation section
- 6 PUSCH transmission section
- 10 DCI generation section
- 11 PDCCH transmission section
- 14 PUSCH reception section
- 15 PH detection section
- 16 transmission antenna number determination section
- 21, 32 radio reception section
- 22 SRS detection section
- 23 channel state estimation section
- 24 scheduling section
- 25 link/rank/layer number selection section
- 26 link/rank/layer number determination section
- 27 PDCCH signal generation section
- 28, 44-1 to 44-N radio transmission section
- 34 modulation scheme/coding rate/rank detection section
- 41-1 to 41-N frequency allocation sections

The invention claimed is:

1. A mobile station apparatus which is configured to and/or programmed to use two or more transmission antennas and is configured to and/or programmed to perform communication with a base station apparatus, the mobile station apparatus comprising:
a PUSCH (Physical Uplink Shared Channel) transmission part configured to and/or programmed to transmit data through changing at least the number of the transmission antennas and a number of transmission streams to use; and
a PH calculation part configured to and/or programmed to calculate a PH (Power Headroom) using a maximum transmit power of the mobile station apparatus, wherein
an individual PH for each transmission stream used for transmitting data is calculated by at least subtracting a transmit power actually transmitted through each respective transmission antenna from the maximum transmit power of the mobile station apparatus, thereby providing a PH that represents a headroom for a transmit power relative to the maximum transmit power in a case where one transmission antenna is used, and
the PUSCH transmission part is configured to and/or programmed to transmit the PH calculated.

2. The mobile station apparatus according to claim 1, wherein
the maximum transmit power is equal to a maximum transmit power for transmitting by using any one of the two or more transmission antennas.

3. The mobile station apparatus according to claim 1, wherein
the PUSCH transmission part is configured to and/or programmed to transmit the calculated PH at a predetermined transmission opportunity.

4. The mobile station apparatus according to claim 1, wherein
the PUSCH transmission part is performed to transmit data by using one of SC-FDMA system and Clustered DFT-S-OFDM system.

5. The mobile station apparatus according to claim 1, wherein
the PUSCH transmission part is performed to transmit data through changing the number of transmission antennas based on information received from the base station apparatus.

6. A transmission method of transmitting data using two or more transmission antennas, the transmission method comprising:
transmitting data through changing at least the number of the transmission antennas and a number of transmission streams to use;
calculating a PH (Power Headroom) using a maximum transmit power of the mobile station apparatus, wherein
an individual PH for each transmission stream used for transmitting data is calculated by at least subtracting a transmit power actually transmitted through each respective transmission antenna from the maximum transmit power of the mobile station apparatus, thereby providing a PH that represents a headroom for a transmit power relative to the maximum transmit power in a case where one transmission antenna is used; and
transmitting the PH calculated.

* * * * *